United States Patent [19]

Chen

[11] Patent Number: 4,956,629
[45] Date of Patent: Sep. 11, 1990

[54] BURGLAR PROOF DEVICE FOR AUTOMOBILE USE

[76] Inventor: Michael Chen, 10F-3, No. 230, Nanking E. Road Sec. 5, Taipei, Taiwan

[21] Appl. No.: 305,977

[22] Filed: Feb. 3, 1989

[51] Int. Cl.$^5$ ............................................. B60R 25/10
[52] U.S. Cl. .................................. 340/429; 340/689; 200/61.52; 200/61.83
[58] Field of Search ................. 340/429, 440, 689; 200/52 A, 61.52, 61.83, DIG. 29, 61.93, 61.45 R

[56] References Cited

U.S. PATENT DOCUMENTS

| | | | |
|---|---|---|---|
| 2,151,938 | 3/1939 | Ramsey et al. | 200/52 A |
| 2,365,262 | 12/1944 | Gair | 200/61.52 |
| 2,946,867 | 7/1960 | Wehrig | 200/61.52 |
| 3,763,484 | 10/1973 | Byers | 340/440 X |
| 3,889,774 | 6/1975 | Schwenk | 200/61.52 X |
| 4,001,185 | 1/1977 | Mitsui et al. | 200/61.45 R |
| 4,467,154 | 8/1984 | Hill | 200/61.45 R |

Primary Examiner—Joseph A. Orsino
Assistant Examiner—Brian R. Tumm
Attorney, Agent, or Firm—Browdy and Neimark

[57] ABSTRACT

A steel ball operated burglar proof device adapted for use in automobile, and particularly mounted on an engine hood and a trunk lid, which is actuated to work once the engine hood or trunk lid is tiltedly lifted at one end. The present device mainly includes a mounting seat and an actuation device with the latter attached on the former, and the former fixed to the inside of the engine hood or trunk lid. The actuation device is made up of a connection terminal, a washer, first and second water sealing rings, a rivet, a tiny steel ball all of which are housed in a torch-shaped metallic casing with the steel ball disposed at the bottom thereof. The connection terminal is coupled to an alarm so that the lifting of the engine hood or trunk lid can cause the tiny steel ball to roll toward the bottom of the rivet, and the contact of the steel ball with the rivet will make the alarm operate instantly.

4 Claims, 5 Drawing Sheets

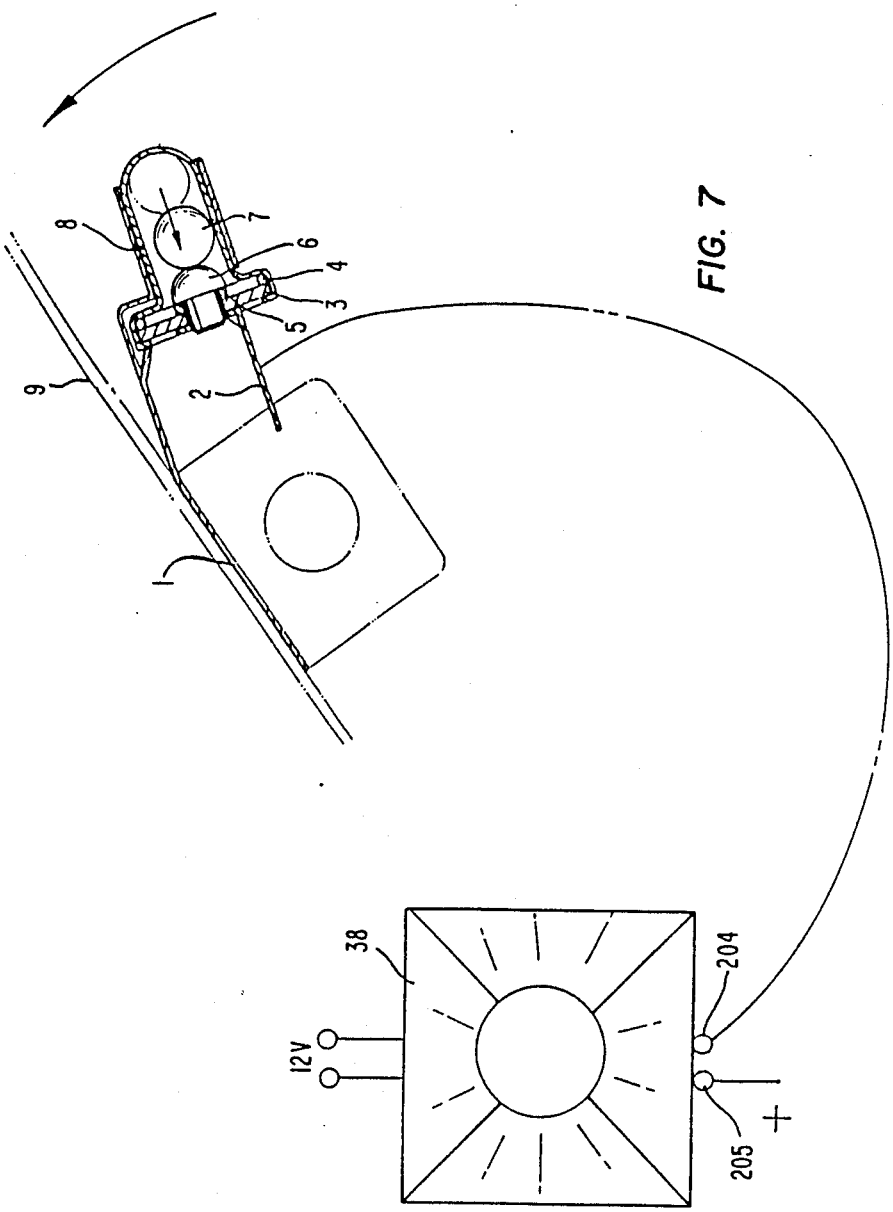

BURGLAR PROOF DEVICE FOR AUTOMOBILE USE

BACKGROUND OF THE INVENTION

The present invention is related to a steel ball actuated burglar proof device which is mounted on the inside of an engine hood or trunk lid, and the lift of the engine hood or trunk lid will cause a steel ball received in a casing to slide or roll toward a metallic rivet received in the casing, and the contact between the two will conduct a circuit which actuates an alarm to work instantly.

Burglar proof devices have been designed in many types for use on vehicles, for example, mechanical, electrical and photoelectric kinds of alarming devices being available on the market at various prices. No matter what kind of burglar proof device is adopted, there must be an actuation means and an alarming means contained therein. As shown in FIG. 1, the conventional burglar proof device mounted on automobiles is fixed on an engine hood or trunk lid or doors thereof by means of a fixing plate 701; when the hood or lid is closed, the actuation stick 702 is pressed downward, causing the burglar alarm to be in a ready mode. Once the force exerted on the actuation stick is removed, the alarm is urged to operate.

However, the general prior burglar proof devices have encountered the following problems in their fixing to the automobiles:

1. The body of the automobile is unavoidably damaged as a result of drilling holes thereon for fixing the burglar proof device thereto. Most of the owners of new cars are reluctant to perform this sort of operation on their new cars.
2. In raining days, water can penetrate the body of a car through such kind of drilling holes and do damage to the internal auto parts as well as the body thereof.
3. It is not easy to locate a proper place for the conventional burglar proof device on a car.
4. The prior burglar proof device takes up a relative large space because of the device having to be mounted in conformance with the room in which it is fixed with the help of an L-shaped fixing bracket 703 as shown in FIG. 1.
5. The prior burglar proof device can be harmful to a person washing or fixing the car equipped with the device, resulting in the cutting of his hands or the tearing of his clothes due to carelessness.
6. The prior burglar proof device is easily damaged by baggages in the trunk or by fixing instrument, is easily distorted in its shape, and is hard to maintain.

The present inventor has noticed the disadvantages inherent with the prior art and at last worked out a steel ball actuated burgular alarm device which solves the above-cited problems.

SUMMRY OF THE INVENTION

Therefore, the primary object of the present invention is to provide a burglar proof device for automobile use, which can be mounted on an engine hood or trunk lid of a car without drilling holes thereon and is attachable to the bolts or screws originally fixed thereon so that water or rain will not penetrate into the body of the car, causing damage to auto parts or the body thereof.

One further object of the present invention is to provide an easy-to-mount burglar proof device which is provided with a mounting seat having two orthogonally adjoined wall plates so that the present invention can be easily adapted to any bolt or screw on an engine hood or trunk lid in assembly.

One still further object of the present invention is to provide a durable compact burglar proof device which is easy to mount and not vulnerable to damage by external objects, and can be available at a low cost.

To better illustrate the structure features and operation mode of the present invention, a number of drawings are presented in company with a detailed description of the preferred embodiment thereof, in which:

BRIEF DESCRIPTION OF THE DRAWINGS

FIG. 7 is a diagram showing the location of the steel ball in an actuation status as a result of the lift of the engine hood or trunk lid.

DETAILED DESCRIPTION OF PREFERRED EMBODIMENT

Figure 1:
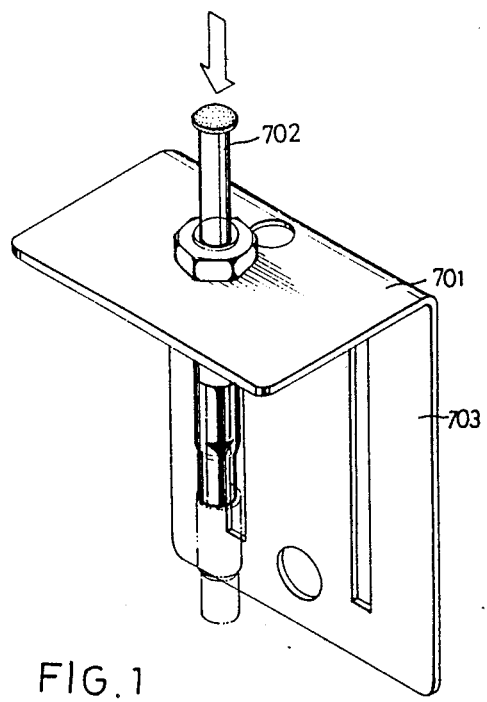
FIG. 1 is a diagram showing a prior burglar proof device.
Figure 2:
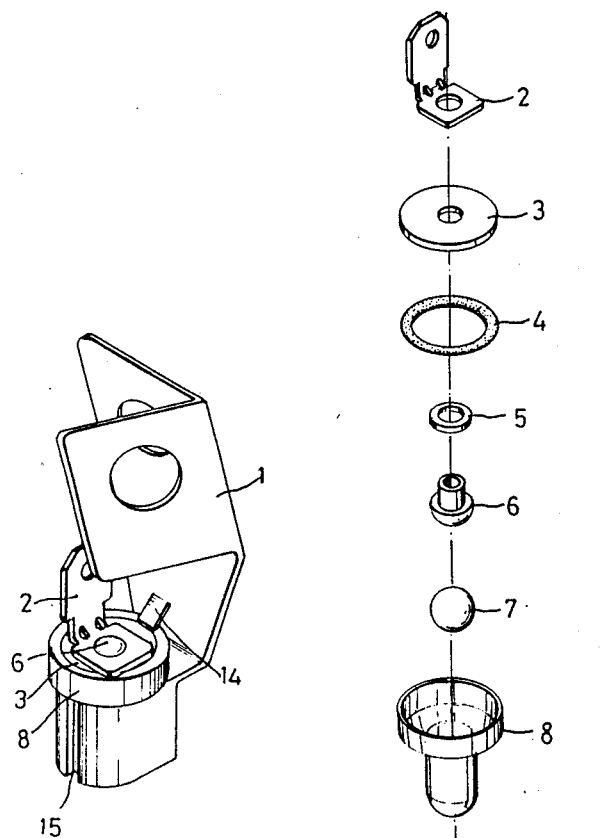
FIG. 2 is a perspective view of the present invention.
Figure 3:
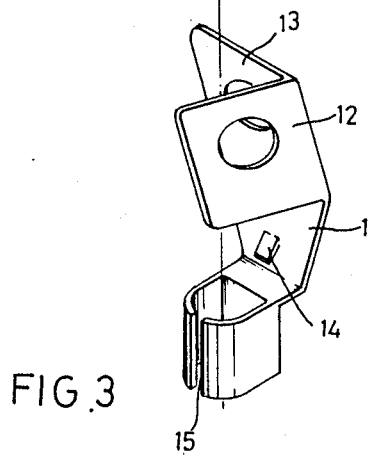
FIG. 3 is a perspective view of the exploded components of the present invention.

Referring to FIGS. 2, 3, the perspective views of the present invention and the exploded components thereof are shown, wherein the mounting seat 1 is provided with a slightly oblique wall plate 13 downwardly extended and in integral relation with another orthogonally adjoined wall plate 12 both of which are provided with a central through hole thereon. At the lower portion of the downward extended wall plate 13 is disposed an oblique restraint piece 14, and the extended wall plate 13 terminates with a horizontally disposed portion. A vertical supporting unit extended downward from the horizontal portion of the mounting seat 1 is provided with a vertical slot 15 extending the full length thereof.

The present invention comprises an actuation assembly including an L-shaped connection terminal 2 which is coupled to an alarm at one end and to a rivet 6 at the other; a circular ring-shaped washer 3 having a central through hole; a first sealing ring 4 and a second sealing ring 5 that are made of rubber material; and the rivet 6 is used to group the washer 3, the first sealing ring 4, the second sealing ring 5 together; and a steel ball 7 disposed under the rivet 6; and a torch-shaped casing 8 in which the steel ball is received together with the above cited group of components with the connection terminal 2 located on the top of the assembly and lying flush with the rim of the torch-shaped casing 8 which consists of an upper circular portion with an open top and a lower tubular portion.

The rim of the torch-shaped casing 8 having a circular open top with peripheral wall and a downward extended tubular portion is engaged with the oblique restraint piece 14 of the mounting seat 1 thereby the actuation assembly received in the casing 8 can be firmly mounted on the mounting seat 1 with the casing 8 engaged with the vertical supporting unit. The steel ball is movably received and located at the bottom of the tubular portion of the torch-shaped casing 8 in normal condition.

Figure 4:
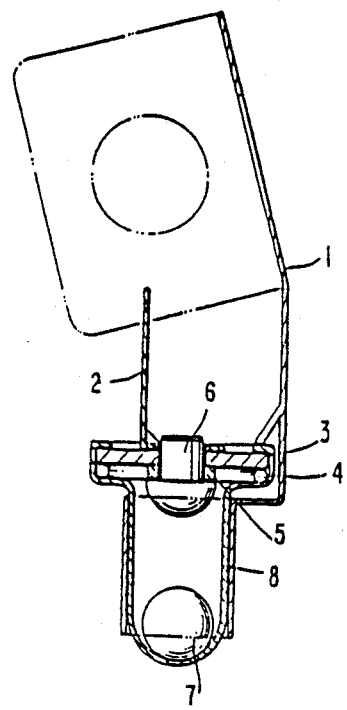
FIG. 4 is a sectional view of the present burglar proof device.

Referring to FIG. 4, the sectional view of the present invention is clear in illustration of the inter-relations of the components of the present invention in assembly. Within the casing 8 is disposed a steel ball 7 which is movably located under the rivet 6, and the rivet 6 is further engaged with a connection terminal 2 with a washer 3 and a water sealing ring 4 disposed therebetween for insulation.

Figure 5:
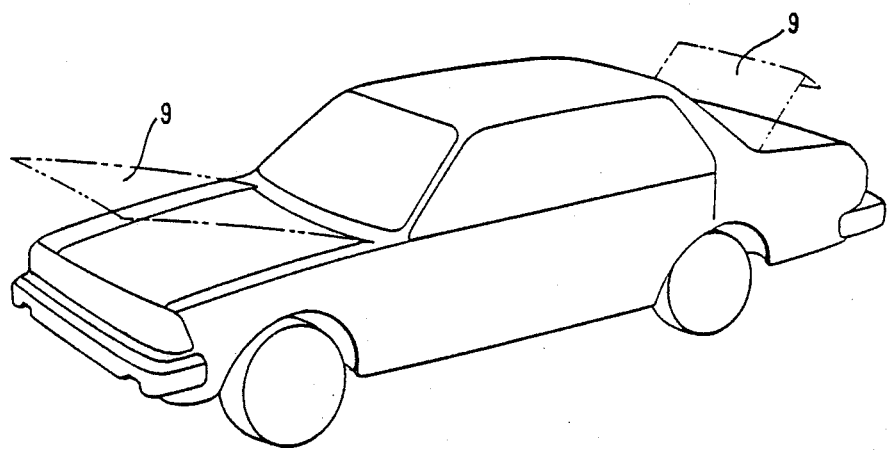
FIG. 5 is a diagram showing the fixing locations of the present invention.
Figure 6:
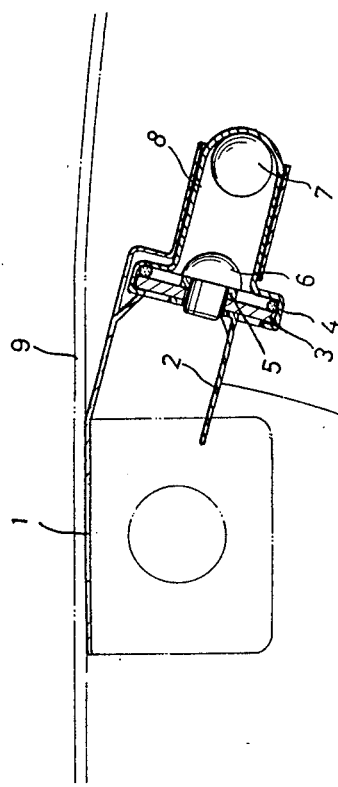
FIG. 6 is a diagram showing the location of the steel ball in a non-actuation status.
Figure 6:
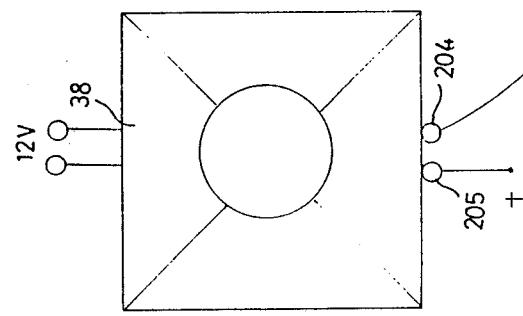

As shown in FIG. 5, the present invention is preferably mounted on any upward tiltable cover such as an engine hood and a trunk lid 9. Referring to FIGS. 6, 7, the connection terminal 2 is coupled to the actuation end 204 of an alarm means 38 and the other actuation end 205 is connected with the positive pole of the car's battery. One of the wall plates of the mounting seat 1 is attached with the inner side of the engine hood or trunk lid 9.

Every part of the body of the vehicle has a ground potential, therefore the mounting seat 1, the torch-shaped casing 8 and the steel ball all have the same ground potential.

Furthermore, the wall plate 13 of the mounting seat 1 is defined in oblique relation with the supporting unit disposed at the end of the same, the steel ball is kept at the bottom of the torch-shaped casing 8 due to the function of gravity as the engine hood or trunk lid is in a closed position. Once the hood or lid is pivotally lifted at one end, the steel ball is forced to roll toward the rivet 6 as a result of gravitational force, resulting in the contact of the two. Thus, the connection terminal 2 is converted to a ground potential, causing the actuation of the alarm 38 accordingly.

What I claim is:

1. An improved burglar proof device adapted for automobile use which can be instantly actuated to make a connected alarm function, comprising:
   a. a connection terminal;
   b. a circular ring-shaped washer;
   c. a first sealing ring;
   d. a second sealing ring;
   e. a rivet;
   f. a steel ball;
   g. a torch-shaped metallic casing; and
   h. a mounting seat;
   wherein said connecting terminal, said circular washer and said second sealing ring are engaged with said rivet in a consecutive order; and in combination with said first sealing ring and said steel ball, said connection terminal, said circular washer, said second sealing ring, and said rivet are received in said torch-shaped casing with said steel ball disposed at the bottom thereof and kept at a distance with said rivet in non-operation state; and said steel ball is movable toward said rivet as a result of gravitation force exerted thereon once the metallic casing is tilted at a specific angle; said torch-shaped metallic casing is removably secured to said mounting seat which is then detachably disposed on the inner side of an engine hood or a trunk lid and wherein said connection terminal is defined as L-shaped with one end thereof connected to an alarm and the other end provided with a through hole, permitting the passage of the tip of said rivet.

2. An improved burglar proof device as claimed in claim 1 wherein said torch-shaped metallic casing has a circular upper section with an open top and a peripheral wall disposed therearound, and a tubular section disposed in connection with said circular upper section and having an opening in communication with the open top of said circular upper section, and said steel ball is movably disposed therein at the bottom thereof.

3. An improved burglar proof device adapted for automobile use which can be instantly actuated to make a connected alarm function, comprising:
   a. a connection terminal;
   b. a circular ring-shaped washer;
   c. a first sealing ring;
   d. a second sealing ring;
   e. a rivet;
   f. a steel ball;
   g. a torch-shaped metallic casing; and
   h. a mounting seat;
   wherein said connecting terminal, said circular washer and said second sealing ring are engaged with said rivet in a consecutive order; and in combination with said first sealing ring and said steel ball, said connection terminal, said circular washer, said second sealing ring, and said rivet are received in said torch-shaped casing with said steel ball disposed at the bottom thereof and kept at a distance with said rivet in non-operation state; and said steel ball is movable toward said rivet as a result of gravitation force exerted thereon once the metallic casing is tilted at a specific angle; said torch-shaped metallic casing is removably secured to said mounting seat which is then detachably disposed on the inner side of an engine hood or a trunk lid and wherein said connection terminal is defined as L-shaped with one end thereof connected to an alarm and the other end provided with a through hole, permitting the passage of the tip of said rivet and wherein said mounting seat has a pair of orthogonally adjoined wall plates which are disposed in oblique relation with the bottom end of one of said wall plate extended downward and integrated with a supporting unit on the wall of which is provided with a vertical slot, extending the full length thereof; on each of said wall plates is disposed a round through hole which is engageable with bolts or screws mounted on an automobile; said torch-shaped metallic casing is removably located in said supporting unit of said mounting seat in assembly; an obliquely disposed restraint member protruding from the bottom surface of said downward extended wall plate is employed to engage with the rim of said upper section of said casing so to fix the same in place.

4. An improved burglar proof device as claimed in claim 3, wherein said torch-shaped metallic casing has a circular upper section with an open top and a peripheral wall disposed therearound, and a tubular section disposed in connection with said circular upper section and having an opening in communication with the open top of said circular upper section, and said steel ball is movably disposed therein at the bottom thereof.

* * * * *